United States Patent
Clark

(10) Patent No.: US 10,427,630 B1
(45) Date of Patent: Oct. 1, 2019

(54) CENTRALLY-MOUNTED GROUND-ROD DRIVER FOR UTILITY VEHICLE

(71) Applicant: Altec Industries, Inc., Birmingham, AL (US)

(72) Inventor: Judd Lea Clark, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/238,097

(22) Filed: Jan. 2, 2019

(51) Int. Cl.
| | |
|---|---|
| B60R 16/06 | (2006.01) |
| E21B 7/02 | (2006.01) |
| B60R 25/00 | (2013.01) |
| H05F 3/02 | (2006.01) |
| H01R 4/66 | (2006.01) |
| B66F 17/00 | (2006.01) |
| B66C 15/00 | (2006.01) |
| B66C 23/88 | (2006.01) |

(52) U.S. Cl.
CPC .......... B60R 16/06 (2013.01); B60R 25/00 (2013.01); E21B 7/02 (2013.01); E21B 7/022 (2013.01); H05F 3/02 (2013.01); B66C 15/00 (2013.01); B66C 23/88 (2013.01); B66F 17/006 (2013.01); H01R 4/66 (2013.01)

(58) Field of Classification Search
CPC ...... E21B 43/2401; E21B 7/027; E21B 43/20; G01R 27/025; H02G 1/10; B60R 16/02
USPC ................. 173/28, 27, 39, 189, 90, 91, 184; 324/557; 340/647, 657; 182/2.4
See application file for complete search history.

(56) References Cited

U.S. PATENT DOCUMENTS

| | | | | |
|---|---|---|---|---|
| 2,216,363 | A * | 10/1940 | Crawford ................ | B60R 16/06 16/18 R |
| 2,667,752 | A   | 2/1954 | Moseley | |
| 3,038,972 | A * | 6/1962 | Lagier ................. | H01R 13/7036 174/7 |
| 3,514,695 | A * | 5/1970 | Skarshaug ............. | G01R 15/14 324/133 |
| 3,769,578 | A * | 10/1973 | Staley ................. | G01R 27/025 324/557 |
| 5,261,514 | A * | 11/1993 | Evans .................. | H02G 11/02 174/5 SG |

FOREIGN PATENT DOCUMENTS

EP 0266206 A1 5/1988

\* cited by examiner

*Primary Examiner* — Nathaniel C Chukwurah
(74) *Attorney, Agent, or Firm* — Erise IP, P.A.

(57) ABSTRACT

A utility vehicle includes a chassis and a centrally-mounted ground-rod driver system. The chassis presents a central area. The centrally-mounted ground-rod driver system is secured to the chassis at the central area. The centrally-mounted ground-rod driver system includes a ground-rod, a driver assembly configured to drive the ground-rod into an underlying surface under the chassis, and a grounding cable associated with the ground-rod so as to allow an electrical discharge through the grounding cable, through the ground-rod, and into the underlying surface. The ground-rod is driven in beneath the central area of the chassis such that a radius of electrified ground of the underlying surface is away from a utility worker.

14 Claims, 7 Drawing Sheets

CENTRALLY-MOUNTED GROUND-ROD DRIVER FOR UTILITY VEHICLE

BACKGROUND

1. Field

Embodiments of the invention relate to aerial devices and utility platforms. More specifically, embodiments of the invention relate to the grounding of utility vehicles working on or around energized or de-energized power lines.

2. Related Art

Utility workers utilize an aerial device, digger derrick, crane, or similar to reach inaccessible locations. These devices generally includes a boom assembly with a utility platform connected to a distal end of the boom. One or more utility workers stand in the utility platform. Utility workers typically use an aerial device to access overhead electric power lines and electric power components for installation, repair, or maintenance. The utility platforms utilized by electric utility workers are highly insulated so as to prevent the discharge of electricity through the utility truck, and especially through the utility worker.

Numerous devices and systems exist to prevent the discharge of electricity through the utility truck. However, despite all these systems, a discharge of electricity can still happen. Thus, there is a need to allow for discharge of electricity through grounding. In the United States, for example, such grounding may be required by law or regulation (such as Occupational Safety and Health Administration standards 29 C.F.R. 1910.269 as well as 29 C.F.R. Part 1926). Some current systems allow for the operator to emplace a ground wire. Emplacing the ground wire includes driving (either manually or via a powered tool) a ground-rod into ground near the work site and attaching the ground wire from the utility vehicle to the ground-rod.

The current method of grounding is disadvantageous for several reasons. First, grounding in this method is difficult and time consuming. Second, based upon it being difficult and time consuming, this method is often not used by utility workers. Third, this method requires extra equipment to be brought to the work site, beyond what is on the utility vehicle. Fourth, the ground-rod creates an area near the work site which the utility workers must avoid as the ground near the ground-rod may become electrified at any time. Fifth, there is a possibility that the utility worker may drive away without removing the ground-rod, thereby damaging the utility vehicle.

SUMMARY

Embodiments of the invention solve the above-mentioned problems by providing a centrally-mounted ground-rod driver system for a utility vehicle. The centrally-mounted ground-rod driver system automatically and independently deploys a ground-rod into the ground from a central area of the utility vehicle. The central area is utilized such that the radius of energized ground around the exterior of the truck (where the utility workers may be walking) is a sufficient radius. The centrally-mounted ground-rod driver system then removes the ground-rod before allowing the vehicle to move. The centrally-mounted ground-rod driver system requires little-to-no additional effort by the utility worker and ensures that the ground-rod is emplaced and removed at each work site.

A first embodiment of the invention is directed to utility vehicle comprising a chassis and a centrally-mounted ground-rod driver system. The chassis presents a central area. The centrally-mounted ground-rod driver system is secured to the chassis at the central area. The centrally-mounted ground-rod driver system includes a ground-rod, a driver assembly configured to drive the ground-rod into an underlying surface under the chassis, and a grounding cable associated with the ground-rod so as to allow an electrical discharge through the grounding cable, through the ground-rod, and into the underlying surface. The ground-rod is driven in beneath the central area of the chassis such that a radius of electrified ground of the underlying surface is away from a utility worker. If an operator is on the chassis or vehicle at time of being energized or near the vehicle at the time of the vehicle being energized, the ground rod being centered under the truck reduces the ground voltage and its variances from the edge of the truck outward. Depending on the quality of the ground, the composition of the ground, moisture content, and voltage being passed, it may still require special grounding mats and work-practices for safe evacuation from the truck.

A second embodiment of the invention is directed a centrally-mounted ground-rod driver system configured to be utilized with a utility vehicle. The centrally-mounted ground-rod driver system includes a ground-rod, a driver assembly configured to drive the ground-rod into an underlying surface under the chassis, and a grounding cable associated with the ground-rod so as to allow an electrical discharge through the grounding cable, through the ground-rod, and into the underlying surface. The ground-rod is driven in beneath the central area of the chassis such that a radius of electrified ground of the underlying surface is away from a utility worker or is reduced.

A third embodiment of the invention is directed to a method of grounding a utility vehicle, comprising the following steps: ensuring that an outrigger system of the utility vehicle is emplaced; instructing a driver assembly, located at a central area of a chassis of the utility vehicle, to drive a ground-rod downward into an underlying surface; obtaining, from a sensor, a resistance reading indicative of the resistance through the ground-rod; comparing the resistance reading to a threshold; and allowing, based upon the resistance reading being over the threshold, a boom assembly of the utility vehicle to begin static operations.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
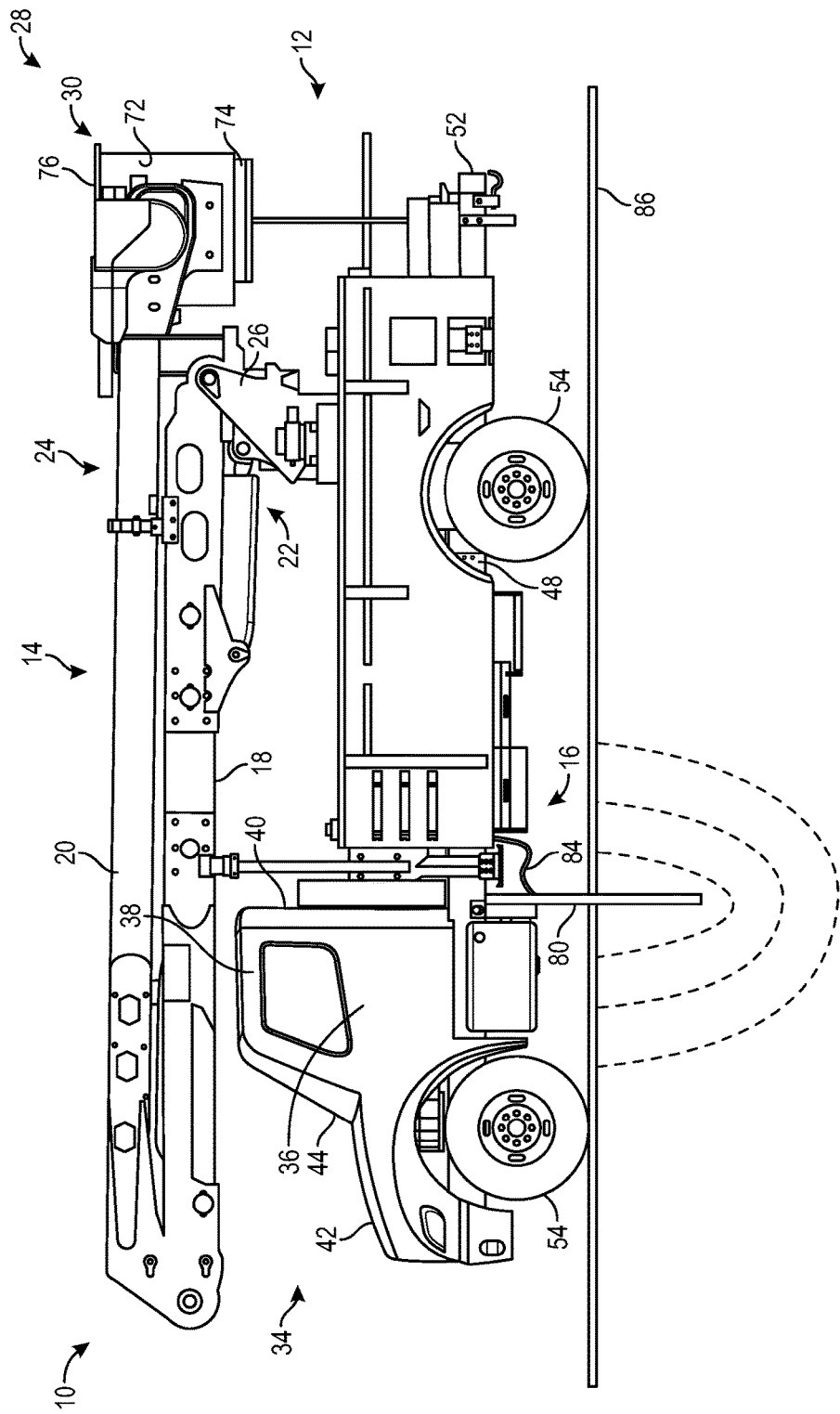
FIG. 1 is side view of a first embodiment of a utility vehicle having a centrally-mounted ground-rod driver system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Turning now to the drawings, a utility vehicle 10 is illustrated in FIG. 1. Broadly, the utility vehicle 10 comprises a base 12, a boom assembly 14, and a centrally-mounted ground-rod driver system 16. The boom assembly 14 is pivotably and/or rotatably secured to the base 12 so as to perform various tasks. The boom assembly 14 may include an upper boom section 18 and a lower boom section 20. The centrally-mounted ground-rod driver system 16 grounds the utility vehicle 10 while the utility vehicle 10 is stationary.

Before discussing the centrally-mounted ground-rod driver system 16 in detail, the components of the boom assembly 14 and the base 12 will be discussed. The boom assembly 14 broadly comprises the lower boom section 20 and the upper boom section 18. The upper boom section 18 may be insulated for so as to reduce the likelihood of a discharge of electricity. Although not illustrated in FIG. 1, some embodiments of the boom assembly 14 may further comprise at least one pivoting boom section.

The boom assembly 14 presents a proximal end 22 and a distal end 24, as best illustrated in FIG. 1. The proximal end 22 is rotatably and/or pivotably secured to a boom turret 26 of the base 12. The distal end 24 is configured to be secured to the tool 28, such as a utility platform assembly 30. In some embodiments, the at least one upper boom section 18 is at least in part disposed within the lower boom section 20. The at least one upper boom section 18 telescopes to extend or retract into the lower boom section 20. In other embodiments, the upper boom section 18 pivots relative to the lower boom section 20, not illustrated. The pivoting boom section does not telescope out of any other boom section. Instead the pivoting boom section rotates about the base 12, and the first boom section pivots and/or rotates relative to the pivoting boom section.

Figure 2:
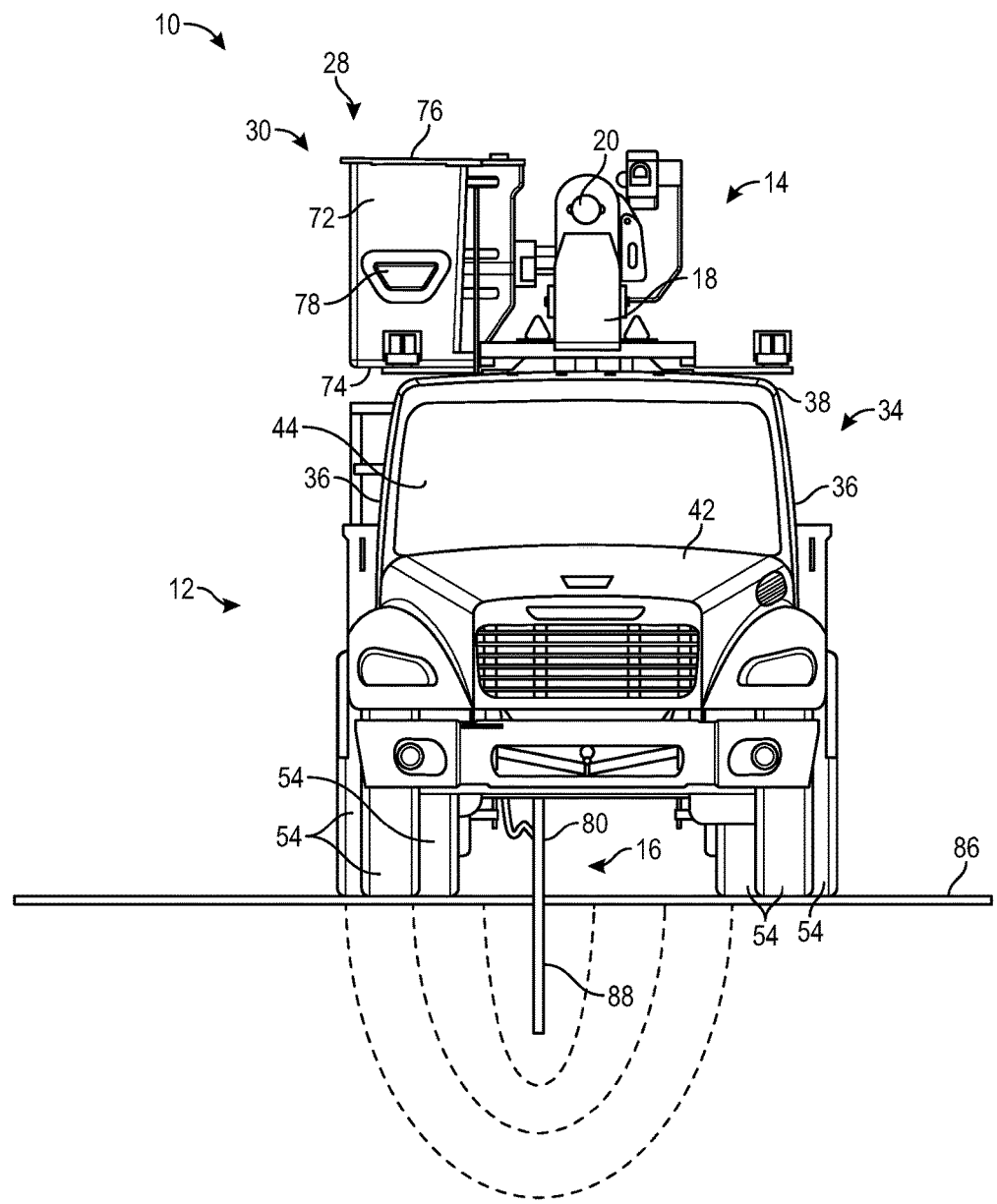
FIG. 2 is front view of the first embodiment of the utility vehicle having the centrally-mounted ground-rod driver system from FIG. 1.
Figure 4:
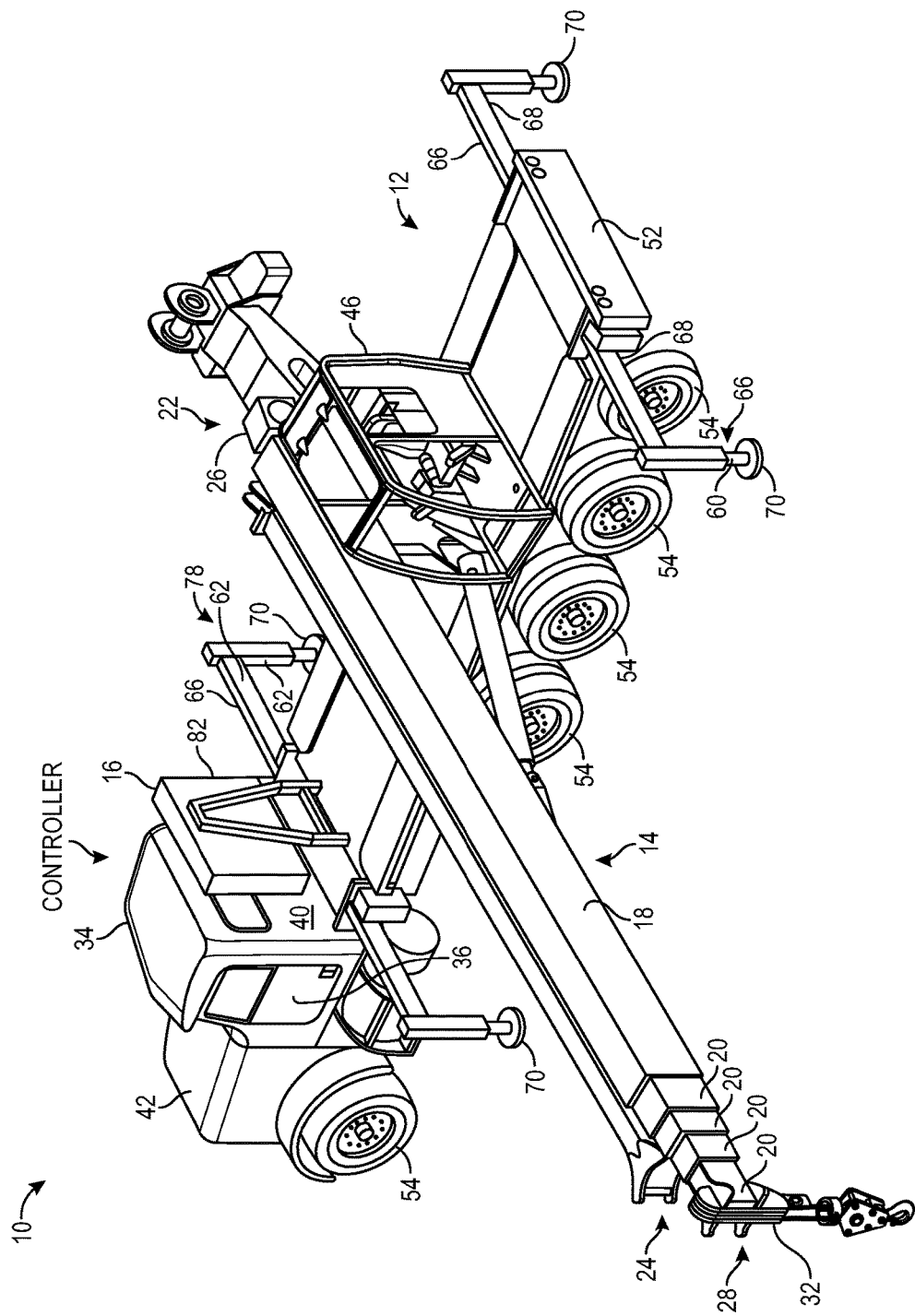
FIG. 4 is perspective view of a second embodiment of a utility vehicle having a centrally-mounted ground-rod driver system.

The distal end 24 of the boom assembly 14 is configured to receive and secure a tool 28 thereto. Examples of a tool 28 include a utility platform assembly 30 (as illustrated in FIGS. 1 and 2), a load line guide 32 (as illustrated in FIG. 4), a jib, a pole guide, a digger derrick, and the like. The utility platform assembly 30 provides an elevated surface from which at least one utility worker can perform a task. The load line guide 32 directs a load line for lifting a load. Other tools may perform other tasks such as moving or lifting a load, digging a hole, or the like.

The base 12 of the utility vehicle 10 is a selectively stabilized platform. In embodiments of the invention, the base 12 is an aerial device (as illustrated in FIG. 1), a digger derrick, a crane base, an oilrig, an earth-working machine, an automobile, or a fixed structure. The base 12 provides stability and a counterweight to a load being supported by the boom assembly 14. The utility vehicle 10 is typically mobile and moves via wheels 54 and/or tracks rotatably secured to the base 12. The operator will then emplace the utility vehicle 10 to be stabilized such that the various tasks may be performed.

A mobile operations cab 34 is utilized to drive or otherwise move the base 12 relative to the ground. The mobile operations cab 34 may include a door 36, a personnel housing 38 with a rear panel 40, an engine housing 42, a windshield 44, and other components. As discussed below, the centrally-mounted ground-rod driver system 16 may be disposed behind and adjacent to the mobile operations cab 34. The base 12 may also include a static operations cab 46 specifically for operating the boom assembly 14 while static.

Generally, the operations of the utility vehicle 10 may be described as static and mobile. Mobile operations are those in which the utility vehicle 10 is traveling or otherwise moving between locations. Mobile operations may include driving and other operations performed by the utility vehicle 10 and/or its subsystems while driving. Static operations are tasks which are performed while the utility vehicle 10 is stationary. Typically, static operations utilize the boom assembly 14 to perform a certain task. As discussed below, certain steps may be performed by a controller or computer (as discussed below) when transitioning between static and mobile operations. For example, transitioning from mobile to static operations may include deploying the outriggers, driving in the ground-rod driver system 16, and providing power to the boom assembly 14. As another example, transitioning from static to mobile operations may include cutting power to the boom assembly 14, retracting the ground-rod driver system 16, stowing the outriggers, and engaging the transmission associated with the wheels 54.

The base 12 includes a chassis 48, which presents a deck 50 at a deck level. In embodiments of the invention, the deck 50 is disposed behind the mobile operations cab 34. As discussed below, the centrally-mounted ground-rod driver system 16 may be disposed between the deck 50 and the mobile operations cab 34. The static operations cab 46 may be disposed on the deck 50. The base 12 may also include one or more bumpers 52. The chassis 48 of the utility vehicle 10 is typically mobile and moves via wheels 54 rotatably secured to the base 12 below deck level.

Figure 3:
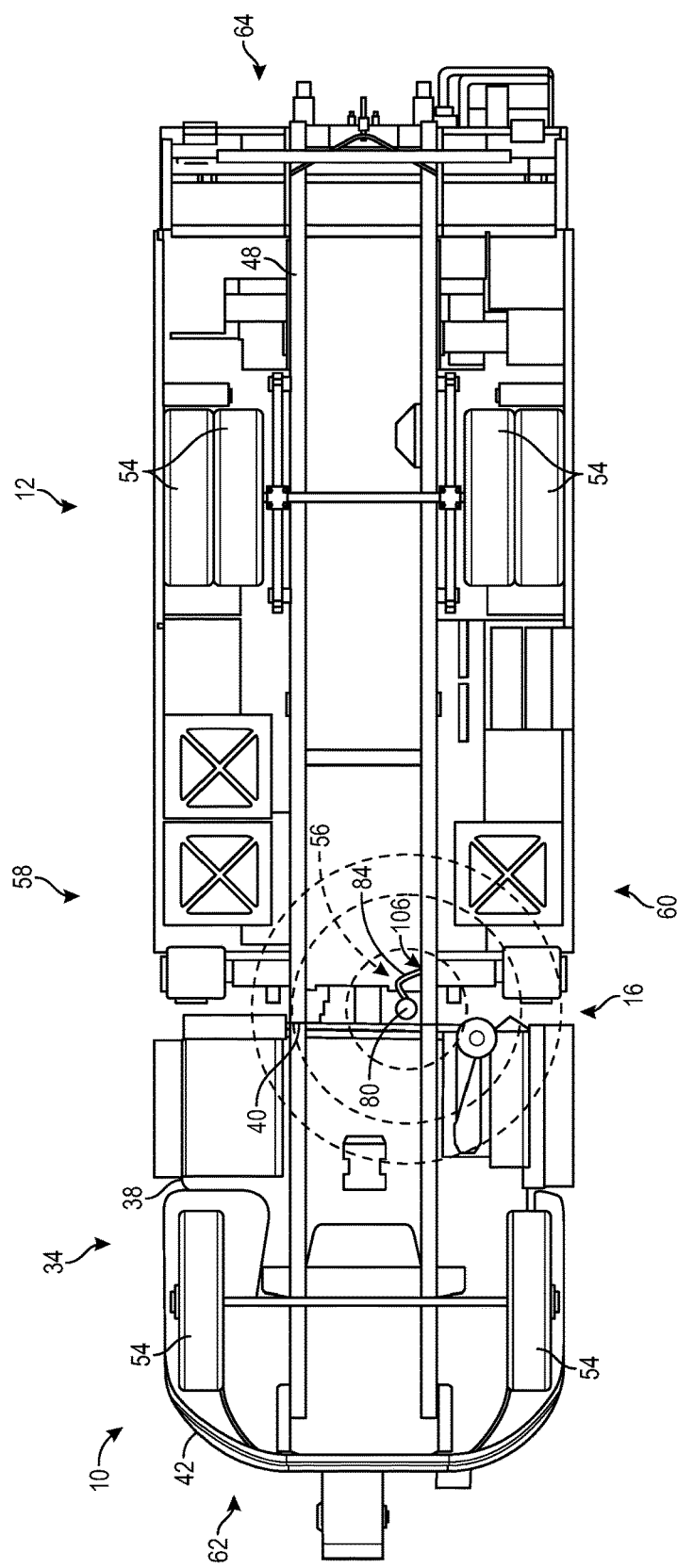
FIG. 3 is a bottom view of the first embodiment of the utility vehicle having the centrally-mounted ground-rod driver system from FIG. 1.

The chassis 48 presents a central area 56 at which the centrally-mounted ground-rod driver system 16 is disposed so as to minimize the chance of electrical discharge through a utility worker. The central area 56 is generally centered laterally between a left side 58 of the chassis 48 and a right side 60 of the chassis 48, as illustrated in FIG. 3. The central area 56 is also generally disposed laterally between a front side 62 and a back side 64 of the chassis 48. A minimum distance is determined as the minimum radius from the center of the central area 56 to an exterior of the utility vehicle 10. The exterior surface of the utility vehicle 10 is an area of the underlying surface upon which a utility worker may be standing or walking in the normal operation of the utility vehicle 10. There are numerous locations along the chassis 48 of the utility vehicle 10 which could be utilized as the central area 56. So long as a location is not near or adjacent to the exterior surface of the utility vehicle 10, it may be used as a central area 56.

In embodiments of the invention, such as shown in FIG. 4, the base 12 of the utility vehicle 10 utilizes at least one outrigger 66 for stabilization. It should be noted that while grounding requirements may exist regardless of whether the utility vehicle 10 includes outriggers 66. The outriggers 66 typically deploy from within, atop, underneath, or alongside the base 12. The outriggers 66 therefore are configured to be selectively placed into a stowed position and a deployed position. When the outriggers 66 are in the stowed position, the utility vehicle 10 is free to maneuver via the wheels 54 and/or tracks because the outriggers 66 are not in contact with the ground. When the outriggers 66 are in the deployed position, the utility vehicle 10 is prevented from maneuver because the outriggers 66 are in contact with the ground. In some embodiments, the outriggers 66 lift the wheels 54 and/or track at least a portion off of the ground. This further prevents movement of the utility vehicle 10 and provides a more stable platform for the task to be performed.

In embodiments of the invention, the base 12 includes a plurality of outriggers 66, such as two, three, four, six, eight, etc. In embodiments of the invention, the outriggers 66 are deployed from the base 12 in a shape (when viewed from above) that is substantially H-shaped (as illustrated in FIG. 1), X-shaped, or other shape. Relative to a forward driving direction, the outriggers 66 may deploy to the sides (as illustrated in FIG. 1), forward and backward, at some intermediate angle therebetween (such as approximately 30 degrees, approximately 45 degrees, approximately 60 degrees relative to the forward/backward direction), etc.

One consideration during the determination of the layout of outriggers 66 relative to the base 12 is the size, shape, and weight distribution of the base 12. For example, if the base 12 is relatively long in the forward direction and relatively thin in the sideways direction, the outriggers 66 may deploy substantially perpendicular to the forward direction (i.e. the sideways direction). This is because the likelihood of the base 12 tipping forward or backward is reduced because of the relative length in the forward direction. A wide base 12 can therefore be achieved via a perpendicular deployment.

As another example, if the base 12 is not substantially longer in the forward direction than in the sideways direction, the outriggers 66 may deploy in a diagonal direction relative to the forward direction, in a substantial X-shape when viewed from above. This is because the likelihood of the base 12 tipping forward or backward has not been reduced by the shape of the base 12.

As best illustrated in FIG. 4, in embodiments of the invention, each outrigger 66 comprises an outrigger mount 66, an actuator (not illustrated), an outrigger leg 68, and an outrigger foot 70. The outrigger mount 66 secures the outrigger 66 to the base 12. The securing may be via a pivot, a recess, or the like. The actuator moves the outrigger 66 from the stowed position to the deployed position. The actuator may operate via a hydraulic cylinder, a pneumatic cylinder, a mechanical actuator, an electric motor, or other outrigger-deploying mechanism. The actuator may laterally elongate the outrigger 66 relative to the base 12 (as illustrated in FIG. 4), elongate the outrigger 66 downward toward the ground, pivot the outrigger 66 relative to the base 12, or another configuration for deploying the outriggers 66. In some embodiments, the outrigger 66 must be deployed manually by the utility worker. In some embodiments, the outriggers 66 deploy automatically, such as upon a selection by the utility worker to engage the boom assembly 14.

In some embodiments, the outriggers 66 deploy in a direction substantially level with the ground. In these embodiments, the outrigger foot 70 may present a substantially elongated vertical shape, such that the outrigger foot 70 may traverse the distance between the outrigger 66 and the ground. In the industry, these types of outriggers 66 are called "out and down" outriggers. In other embodiments, the outriggers 66 deploy by pivoting diagonally downward toward the ground. In still other embodiments, the outriggers 66 may deploy by extending diagonally downward toward the ground.

The utility platform assembly 30 provides an elevated surface from which at least one utility worker can perform a task. As illustrated in FIGS. 1 and 2, embodiments of the utility platform assembly 30 comprise four bucket sidewalls 72 and a bucket floor 74 that collectively form a cavity. The utility platform assembly 30 may also present a bucket lip 76 along a top portion of at least one bucket sidewall 72. The utility platform assembly 30 may further comprise a step 78 (as illustrated in FIG. 2) and/or a door (not illustrated) in at least one of the bucket sidewalls 38 to allow for ingress and egress of the utility worker.

The centrally-mounted ground-rod driver system 16 will now be discussed in more detail. In embodiments of the invention, the centrally-mounted ground-rod driver system 16 comprises a ground-rod 80, and a driver/retractor assembly 82, and a grounding cable 84. The centrally-mounted ground-rod driver system 16 is used to provide easy and reliable grounding of the utility vehicle 10. The centrally-mounted ground-rod driver system 16 removes or reduces the requirement of the utility worker to manually ground the utility vehicle 10 prior to performing static operations. The centrally-mounted ground-rod driver system 16 also keeps the ground-rod 80 (and by extension, the radius of electrified ground) substantially away from an area upon which the utility worker may be walking. The centrally-mounted ground-rod driver system 16 is disposed on the chassis 48 in or near the central area 56 so as to maximize the electrified radius of an underlying surface 86 upon which the utility worker may be walking or standing.

The electrified radius is illustrated in FIGS. 1-3. Electrical current extends from the driven ground-rod 80 during an electrical discharge. Depending on the material composition of the underlying surface 86, the electrical current extends substantially radially from ground-rod 80 both laterally and vertically. As the electrical current extends outward from the ground-rod 80, the voltage reduces by the inverse square law. Thus, by maximizing the electrified radius at which the utility worker may contact the electrified ground, the voltage encountered (and by extension the likelihood and intensity of electrical discharge) is reduced.

The centrally-mounted ground-rod driver system 16 is disposed at least at a minimum radius from a lateral edge of the utility vehicle 10. The lateral edge is an edge that is disposed vertically at either the front, back, left, or right side of the base 12. The minimum radius is based upon the radius of electrified ground needed to prevent electrical discharge through a utility worker, as discussed above. It is 'minimum' as it is measured from whichever direction is the shortest radius to where a utility worker may be standing or walking in operation of the utility vehicle 10. It should be appreciated that, because of the locations of other components (such as the boom assembly 14), the centrally-mounted ground-rod driver system 16 may not be exactly centered between the left and the right side of the chassis 48, such as illustrated in FIG. 3.

In embodiments of the invention, the centrally-mounted ground-rod driver system 16 is secured to the chassis 48 behind the mobile operations cab 34. By disposing the centrally-mounted ground-rod driver system 16 behind the mobile operations cab 34, the minimum radius to the lateral edge of the utility vehicle 10 (which is associated with the radius of electrified ground) does not extend beyond the front of the utility vehicle 10. Disposing the centrally-mounted ground-rod driver system 16 behind the mobile operations cab 34 also allows for the vertical clearance needed by the centrally-mounted ground-rod driver system 16 to not interfere with the mobile operations cab 34.

In embodiments of the invention, the centrally-mounted ground-rod driver system 16 is secured to the chassis 48 in front of the deck 50. This allows the centrally-mounted ground-rod driver system 16 to pass between the deck 50 and the mobile operations cab 34. Many utility vehicles 10 present an opening between the mobile operations cab 34 and the deck 50, such that the centrally-mounted ground-rod driver system 16 may be retrofitted into an existing utility vehicle 10 in this opening. This allows the centrally-mounted ground-rod driver system 16 to be added to an existing utility vehicle 10 with minimal redesign needed.

In embodiments of the invention, at least a portion of the centrally-mounted ground-rod driver system 16 permits free movement or flexibility relative to the chassis 48. This free movement or flexibility reduces a side load on at least a portion of the centrally-mounted ground-rod driver system 16 that would be caused by heaving of the chassis due to external loads (such as by movement of the boom assembly 14, the application of a load to the boom assembly 14, or by movement of the outriggers 66). Side loads may damage or break the centrally-mounted ground-rod driver system 16 or may reduce the quality of the grounding achieved thereby. This free movement may be limited in distance and/or direction.

In embodiments of the invention, the centrally-mounted ground-rod driver system 16 drives a ground-rod 80 into the underlying surface 86 below the chassis 48 of the utility vehicle 10. The centrally-mounted ground-rod driver system 16 of embodiments comprises the ground-rod 80, the driver assembly 82, and the grounding cable 84. The ground-rod 80 is rigid so as to allow the ground-rod 80 to be driven into an underlying surface 86 by force of the driver assembly 82. Electrical energy from the chassis 48 (e.g., via the boom assembly 14) is directed to the ground-rod 80 via the grounding cable 84, should the chassis 48 become energized. As such, the electrical discharge is permitted away from the utility worker and other critical equipment.

In embodiments of the invention, the ground-rod 80 is rigid and unitary. In some embodiments of the invention, the ground-rod 80 includes shaft 88 and a driving head 90. The driving head 90 is configured to assist in the ground-rod 80 breaking through the underlying surface 86. The driving head 90 is thus disposed at a distal end 92 of the ground-rod 80. The driving head 90 may include a beveled end, a tapered end, a flared end, or an end of another shape that is configured to break or cleave the underlying surface 86 as the driving head 90 is driven therein. Examples of the driving head 90 may include a spade, a flat tip, a point, a stake driver, or other structure. In some embodiments, the driving head 90 may be replaceable as the driving head 90 is more susceptible to damage. In these embodiments, the ground-rod 80 is typically driven linearly.

In some embodiments, the ground-rod 80 presents a screw protrusion 94 extending helically from the shaft 88. The screw protrusion 94 may extend for the entirety of a length presented by the shaft 88, at least half of the length presented by the shaft 88, at least one quarter of the length presented by the shaft 88, of a length corresponding to a standard driving depth, or of another length. In these embodiments, the ground-rod 80 is typically driven rotationally. In some embodiments, the ground-rod 80 presents the shaft 88, the screw protrusion 94, and the driving head 90. In other embodiments, the ground-rod 80 presents the shaft 88 and the screw protrusion 94 with the screw protrusion 94 tapering off at the distal end 92 of the shaft 88.

In embodiments of the invention, the driver assembly 82 is configured to drive the ground-rod 80 into the underlying surface 86 under the chassis 48. The driver assembly 82 exerts a downward and/or rotational force of the ground-rod 80 so as to drive the ground-rod 80 into the underlying surface 86. The driver assembly 82 is configured to drive the ground-rod 80 without manual intervention by the utility worker, such that the utility worker need not perform any function to drive the ground-rod 80 thereby reducing the chance that the grounding of the utility vehicle 10 will be overlooked. Various embodiments of the invention may utilize any of various types of driver assemblies. In embodiments of the invention, the driver assembly 82 is powered by the utility vehicle 10, either directly or indirectly.

In some embodiments of the invention, the driver assembly 82 is powered by a power source comprising hydraulic power via hydraulic lines 96. In these embodiments, the hydraulic power comes from a hydraulic pump (not illustrated) associated with the base 12 is utilized to drive the ground-rod 80. In some embodiments, the hydraulic pump is the same hydraulic pump is as utilized to move the boom assembly 14, deploy the outriggers 66, and perform other functions. In other embodiments, the hydraulic pump is a stand-alone hydraulic pump dedicated to driving the ground-rod 80.

In some embodiments of the invention, the driver assembly 82 is powered by a power source comprising electrical power. In these embodiments, the electrical power may come from a battery, from the internal combustion engine powering the utility vehicle 10, or from another source. In these embodiments, the driver assembly 82 is electro-mechanical.

In some embodiments of the invention, the driver assembly 82 is powered by a power source comprising pneumatic power. In these embodiments, the pneumatic power may come from a pneumatic pump associated with the utility vehicle 10 or from a dedicated hydraulic pump.

In embodiments of the invention, the driver assembly 82 includes a hydraulic or pneumatic cylinder. The hydraulic cylinder comprises a rod disposed at least partially within a barrel, not illustrated. The rod includes a piston (not illustrated) fully disposed within the barrel. A void (not illustrated) is formed between the piston and the barrel and a cap on the interior side. The hydraulic cylinder is elongated by pumping hydraulic fluid into the void so as to enlarge the void (and by extension push the rod and piston relative to the barrel). The pumping is performed by a pump via hydraulic or pneumatic lines. The cylinder extends the ground-rod 80 downward into the underlying surface 86. The hydraulic or pneumatic cylinder may be used in combination with other structures to cause the discussed driving of the ground-rod 80.

Figure 5A:
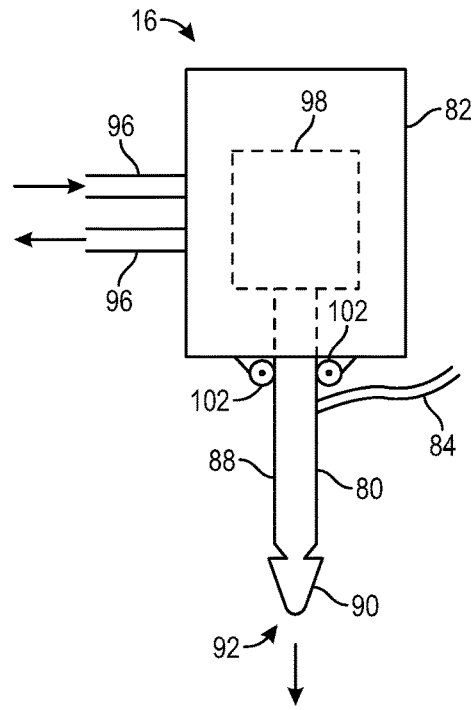
FIG. 5A is a schematic diagram showing a first embodiment of a jackhammer-type centrally-mounted ground-rod driver system.

In embodiments of the invention, the driver assembly 82 includes a jackhammer apparatus 98 (such as a pneumatic drill or a pneumatic hammer), as illustrated in FIG. 5A. The jackhammer apparatus 98 operates by driving an internal hammer (not illustrated) up and down on the ground-rod 80, thus exerting a downward force on the ground-rod 80 with each blow. The jackhammer apparatus 98 may be used in combination with the hydraulic or pneumatic cylinder to continue to move downward to continue driving the ground-rod 80. The jackhammer apparatus 98 may also be used in combination with other structures to cause the discussed driving of the ground-rod 80.

Figure 5B:
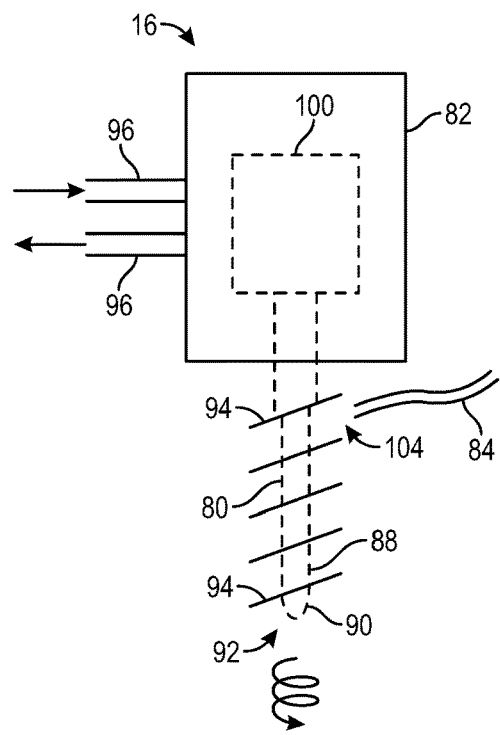
FIG. 5B is a schematic diagram showing a second embodiment of a screw-type centrally-mounted ground-rod driver system.

In embodiments of the invention, the driver assembly 82 includes a screwdriver apparatus 100, as illustrated in FIG. 5B. The screwdriver apparatus 100 operates by helically driving the ground-rod 80, thus exerting a rotational force on the ground-rod 80. When the ground-rod 80 strikes the underlying surface 86 below the central area 56, the screwdriver's rotational force drives the ground-rod 80 further within the underlying surface 86.

In embodiments of the invention, the driver assembly 82 includes at least one retraction roller 102 associated with the ground-rod 80 for removing the ground-rod 80 from the underlying surface 86. The retraction rollers 102 may be passive during the driving of the ground-rod 80 and active during retraction of the ground-rod 80. In other embodiments, the retraction may be performed by reversing the screwdriver apparatus 100 or by another method.

In embodiments of the invention, the centrally-mounted ground-rod driver system 16 comprises the grounding cable 84. The grounding cable 84 is associated with the ground-rod 80 so as to allow an electrical discharge through the grounding cable 84, through the ground-rod 80, and into the underlying surface 86. The grounding cable 84 is formed of an electrically conductive material so as to allow for the discharge of electrical energy therethrough. The grounding cable 84 may comprise an insulative sheath to prevent unintentional discharge from the grounding cable 84 through another object such as a tool 28 or utility worker near the grounding cable 84. The grounding cable 84 comprises a distal end 104 and a proximal end 106.

In embodiments of the invention, the distal end 104 of the grounding cable 84 is permanently attached to the ground-rod 80. In these embodiments, the grounding cable 84 is flexible and permanently attached to the ground-rod 80 at the shaft 88. As the ground-rod 80 is driven by the driving assembly, the grounding cable 84 travels along with the ground-rod 80 toward the underlying surface 86. In other embodiments, the utility worker secures the distal end 104 of the grounding cable 84 to the ground-rod 80 after the ground-rod 80 has been driven into the underlying surface 86, such as in FIG. 5B.

In embodiments of the invention, the proximal end 106 of the grounding cable 84 is secured to the chassis 48 or other component of the base 12 of the utility vehicle 10, as can be seen in FIG. 3. In other embodiments, the proximal end 106 of the grounding cable 84 may be secured to the boom assembly 14, such as at the boom turret 26. The proximal end 106 of the grounding cable 84 is secured to the chassis 48 or other component so as to provide a low-resistance path for electrons to travel upon the chassis 48 or other component becoming electrified.

Figure 6:
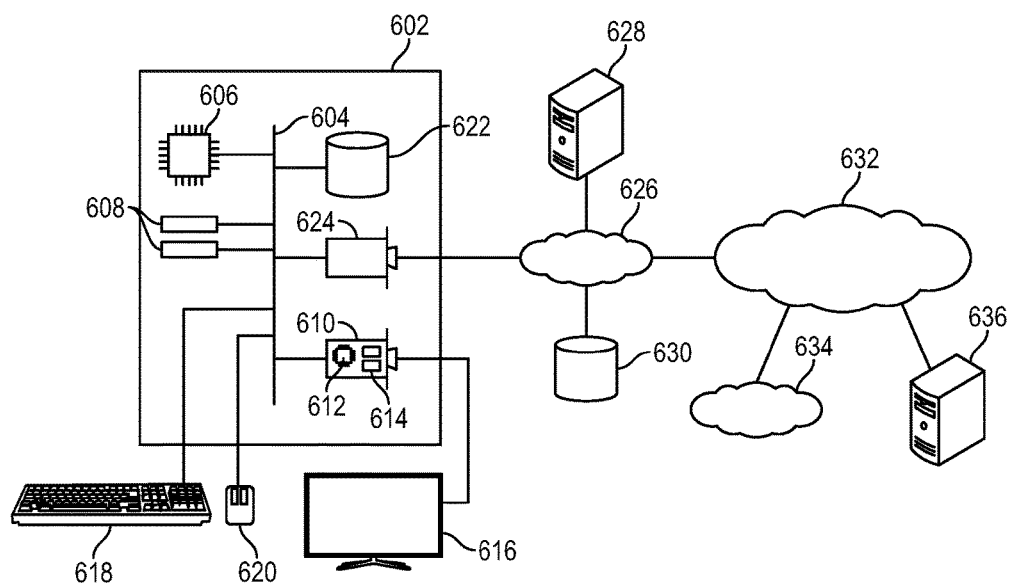
FIG. 6 is a hardware diagram showing various computer hardware which may implement methods of the invention.
Figure 7:
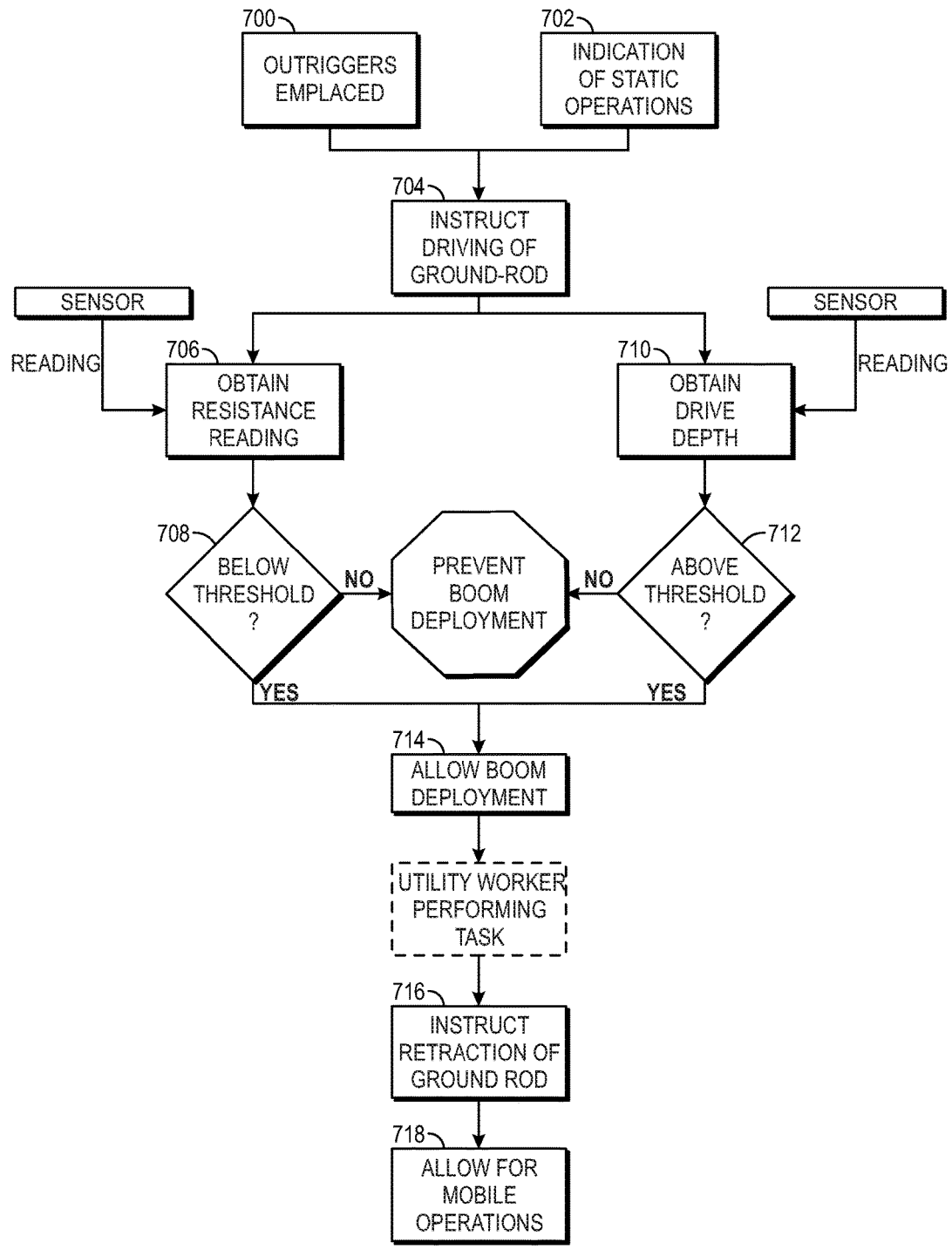
FIG. 7 is a method diagram showing exemplary steps of grounding a utility vehicle.

Before discussing the controlling steps, exemplary hardware for implementing these steps will be discussed. Turning first to FIG. 6, an exemplary computer hardware platform for certain embodiments of the invention is depicted. Computer 602 can be a desktop computer, a laptop computer, a server computer, a dedicated controlling computer for the utility vehicle 10, a mobile device such as a smartphone or tablet, or any other form factor of general- or special-purpose computing device, usable for controlling the equipment as discussed below. In other embodiments, computer 602 takes the form of an embedded controller and may omit the traditional peripherals depicted and described below in favor of dedicated input controls and outputs for operating the equipment.

Depicted with computer 602 are several components, for illustrative purposes. In some embodiments, certain components may be arranged differently or absent. Additional components may also be present. Included in computer 602 is system bus 604, whereby other components of computer 602 can communicate with each other. In certain embodiments, there may be multiple busses or components may communicate with each other directly. Connected to system bus 604 is central processing unit (CPU) 606. Also attached to system bus 604 are one or more random-access memory (RAM) modules. Also attached to system bus 604 is graphics card 610. In some embodiments, graphics card 604 may not be a physically separate card, but rather may be integrated into the motherboard or the CPU 606. In some embodiments, graphics card 610 has a separate graphics-processing unit (GPU) 612, which can be used for graphics processing or for general purpose computing (GPGPU). Also on graphics card 610 is GPU memory 614. Connected (directly or indirectly) to graphics card 610 is display 616 for user interaction. In some embodiments no display is present, while in others it is integrated into computer 602. Similarly, peripherals such as keyboard 618 and mouse 620 are connected to system bus 604. Like display 616, these peripherals may be integrated into computer 602 or absent. Also connected to system bus 604 is local storage 622, which may be any form of computer-readable media, and may be internally installed in computer 602 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 624 is also attached to system bus 604 and allows computer 602 to communicate over a network such as network 626. NIC 624 can be any form of network interface known in the art, such as Ethernet, ATM, fiber, Bluetooth, or Wi-Fi (i.e., the IEEE 802.11 family of standards). In vehicular embodiments, a controller area network (CAN) and/or the RS-485 (also known as TIA-485 or TIA-485-A) standard can be used for communication between components. NIC 624 connects computer 602 to local network 626, which may also include one or more other computers, such as computer 628, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 628, accessible on a local network such as local network 626, or remotely accessible over Internet 132. Local network 626 is in turn connected to Internet 132, which connects many networks such as local network 626, remote network 134 or directly attached computers such as computer 136. In some embodiments, computer 602 can itself be directly connected to Internet 132.

In some embodiments, computer 602 is directly connected to and controls equipment as discussed below. In other embodiments, computer 602 communicates via network 626 or Internet 132 with another computer (such as computer 628 or computer 136) that controls the equipment. In still other embodiments, computer 602 controls (directly or indirectly) simulated equipment (for example, for the purpose of training an equipment operator).

One or more interlocks may be utilized for ensuring that various steps are performed before allowing subsequent steps. The interlocks may include computerized and/or mechanical components and/or logic. A first interlock may be utilized to ensure that the outrigger system (if equipped) is deployed before allowing the driver assembly 82 to drive the ground-rod 80. A second interlock may be utilized to ensure that the ground-rod 80 is emplaced before allowing static operations to begin. A third interlock may be utilized to ensure that the ground-rod 80 is removed before allowing the outrigger system to stow or allowing mobile operations to begin. It should be appreciated that the terms 'first,' 'second,' and 'third' as used herein are illustrative and that any combination of the interlocks (in addition to other interlocks) may be utilized by the utility vehicle 10.

In embodiments of the invention, a first interlock ensures that an outrigger system is deployed before allowing the driver assembly 82 to drive the ground-rod 80. This prevents deployment of the outriggers 66 when the ground-rod 80 is already driven, which can cause stresses and strains on the driven ground-rod 80 and may withdraw the driven ground-rod 80.

In embodiments of the invention, a second interlock ensures that the ground-rod 80 is emplaced before allowing static operations to begin. This prevents usage of the boom assembly 14 and other equipment until the ground-rod 80 is emplaced. In some embodiments, the utility worker may be able to override this interlock, such as by manually driving a separate ground-rod (not illustrated). A first example of when the separate ground-rod 80 may be utilized includes if the utility vehicle 10 is parked above concrete, asphalt, or another underlying surface 86 that should not or cannot be driven into. A second example of when the separate ground-rod 80 may be utilized includes if the driver assembly 82 fails to achieve a proper driving depth for any of various reasons. A third example may be upon the utility worker indicating that the static operations are not going to be utilized near electrical lines or other potentially electrifying objects.

In embodiments of the invention, a third interlock ensures that the ground-rod 80 is removed before allowing mobile operations to begin. This ensures that the utility worker does not attempt to drive away with the ground-rod 80 still in the underlying surface 86. Such actions could damage the driver assembly 82, the grounding cable 84, and other components. If the ground-rod 80 was not driven (for any of the reasons discussed above, for example), this interlock may be disabled or overridden.

An exemplary method of embodiments of the invention will now be discussed. The method may be a computerized method, such as implemented at least in part by the above-discussed computing hardware, or a mechanical method, or a combination thereof. A first method is method of grounding a utility vehicle 10, comprising the following steps: ensuring that an outrigger system of the utility vehicle 10 is emplaced; instructing a driver assembly 82, located at a central area 56 of a chassis 48 of the utility vehicle 10, to drive a ground-rod 80 downward into an underlying surface 86; obtaining, from a sensor, a resistance reading indicative of the resistance through the ground-rod 80; comparing the resistance reading to a threshold; and allowing, based upon the resistance reading being over the threshold, a boom assembly 14 of the utility vehicle 10 to begin static operations.

In Step 700, the controller ensures that an outrigger system of the utility vehicle 10 is emplaced. This may be performed by instructing the outrigger system to deploy, receiving an indication that the outrigger system has been successfully deployed, by monitoring the status of various systems, receiving a level indication indicative of an angle of the chassis 48 relative to horizontal, or by another method. It should be appreciated that some embodiments of the utility vehicle 10 may not include an outrigger system, such as shown in FIG. 1, such that some embodiments of the method may not perform this step.

In Step 702, the controller receives an indication that the utility worker intends to begin static operations. This may be performed by selecting a certain mode, by operating the hydraulic controllers (on either a set of upper boom controls or a set of lower boom controls), or the like. This Step may include presenting to the utility worker an option to bypass the deployment of the centrally-mounted ground-rod 80 driver system 16, for example if the utility vehicle 10 is above concrete or asphalt. If so, the utility worker may then provide an indication that the utility worker has manually driven the other ground-rod 80 in another location (e.g., away from the central area 56).

In Step 704, the controller instructs the driver assembly 82, located at a central area 56 of a chassis 48 of the utility vehicle 10, to drive the ground-rod 80 downward into an underlying surface 86. This may be an electronic message to a second controller associated with the driver assembly 82, an electronic message to open a certain hydraulic or pneumatic valve, or another message.

In Step 706, the controller obtains, from a sensor, a resistance reading indicative of the resistance through the ground-rod 80. The resistance determines how easily an electrified chassis 48 can discharge through the ground-rod 80 (as opposed to another way such as by contact with the utility worker). The resistance reading may be influenced by the driving depth, the composition of the underlying surface 86, the inherent resistance of the ground-rod 80 itself, among other factors.

In Step 708, the controller may also compare the resistance reading to a threshold. If the resistance is above the threshold, that is if there is too much resistance detected, the controller prevents deployment of the boom assembly 14. If the resistance is below the threshold, the controller may allow the boom assembly 14 of the utility vehicle 10 to begin static operations. The controller may additionally or alternatively present a warning to the utility worker based upon the resistance reading. The controller may additionally or alternatively instruct the driver assembly 82 to drive the ground-rod 80 deeper to decrease the resistance.

In Step 710, the controller obtains, from a second sensor, a drive depth reading indicative of a drive depth into the underlying surface 86 of the ground-rod 80 accomplished by the driver assembly 82. The controller may then compare the drive depth reading to a second threshold in Step 712. Based upon the drive depth reading being over the threshold, the boom assembly 14 of the utility vehicle 10 to begin static operations. The controller may also present, upon the drive depth reading being below the threshold, a warning to a utility worker. In Step 714, the controller allows for static operations to commence, such as by allowing hydraulic or pneumatic power to flow through a valve. The controller may also present audible or visible indications to the utility worker indicative that static operations may begin Following the completion of the static operations, in Step 716 the controller instructs at least one retraction roller 102 to retract the ground-rod 80 from the underlying surface 86, or otherwise instructs the driving assembly to retract the ground-rod 80 from the underlying surface 86. The controller will then determine that the ground-rod 80 has been retracted, such as via the retraction rollers 102. In Step 718, the controller allows the chassis 48 of the utility vehicle 10 to begin mobile operations upon determining that the ground-rod 80 has been withdrawn.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A utility vehicle comprising:
a chassis presenting a central area; and
a centrally-mounted ground-rod driver system secured to the chassis at the central area, including—
a ground-rod;
a driver assembly configured to drive the ground-rod into an underlying surface under the chassis; and
a grounding cable associated with the ground-rod so as to allow an electrical discharge through the grounding cable, through the ground-rod, and into the underlying surface,
wherein the ground-rod is driven in beneath the central area of the chassis such that a radius of electrified ground of the underlying surface is away from a utility worker.

2. The utility vehicle of claim 1
wherein the central area is disposed at least at a minimum radius from a lateral edge of the utility vehicle,
wherein the minimum radius is based upon the radius of electrified ground needed to prevent electrical discharge through a utility worker.

3. The utility vehicle of claim 1, further comprising:
a first interlock to ensure that an outrigger system is deployed before allowing the driver assembly to drive the ground-rod.

4. The utility vehicle of claim 1, further comprising:
a second interlock to ensure that the ground-rod is emplaced before allowing static operations to begin,
a third interlock to ensure that the ground-rod is removed before allowing mobile operations to begin.

5. The utility vehicle of claim 1, further comprising:
retraction rollers associated with the ground-rod for removing the ground-rod from the underlying surface.

6. The utility vehicle of claim 1,
wherein the chassis includes a deck and a cab,
wherein the centrally-mounted ground-rod driver system is secured to the chassis behind the cab.

7. The utility vehicle of claim 6, wherein the centrally-mounted ground-rod driver system is secured to the chassis in front of the deck.

8. The utility vehicle of claim 1, wherein the driver assembly is powered by a power source selected from the group consisting of pneumatic power, hydraulic power, and electrical power.

9. The utility vehicle of claim 8, wherein the driver assembly is hydraulic drive hammer.

10. A ground-rod driver system configured to be used with a utility vehicle, the ground-rod driver system comprising:
a ground-rod;
a driver assembly configured to drive the ground-rod into an underlying surface under the chassis; and
a grounding cable associated with the ground-rod so as to allow an electrical discharge through the grounding cable, through the ground-rod, and into the underlying surface,
wherein the ground-rod is driven in beneath a central area of the chassis such that a radius of electrified ground of the underlying surface is away from a utility worker.

11. The ground-rod driver system of claim 10, further comprising:
a first interlock to ensure that an outrigger system is deployed before allowing the driver assembly to drive the ground-rod.

12. The ground-rod driver system of claim 10, further comprising:
a second interlock to ensure that the ground-rod is emplaced before allowing static operations to begin,
a third interlock to ensure that the ground-rod is removed before allowing mobile operations to begin.

13. The ground-rod driver system of claim 10, further comprising:
retraction rollers associated with the ground-rod for removing the ground-rod from the underlying surface.

14. The ground-rod driver system of claim 10, wherein the driver assembly is hydraulic drive hammer.

* * * * *